United States Patent
Chen et al.

(10) Patent No.: US 12,413,563 B2
(45) Date of Patent: Sep. 9, 2025

(54) METHOD, DEVICE, AND PROGRAM PRODUCT FOR INFERENCE

(71) Applicant: Dell Products L.P., Round Rock, TX (US)

(72) Inventors: Tianxiang Chen, Shanghai (CN); Jinpeng Liu, Shanghai (CN); Wenqing Peng, Dezhou (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/434,964

(22) Filed: Feb. 7, 2024

(65) Prior Publication Data

US 2025/0220006 A1      Jul. 3, 2025

(30) Foreign Application Priority Data

Dec. 29, 2023   (CN) .......................... 202311873051.0

(51) Int. Cl.
| | |
|---|---|
| H04L 29/06 | (2006.01) |
| G06F 21/55 | (2013.01) |
| G06N 3/08 | (2023.01) |
| H04L 9/40 | (2022.01) |

(52) U.S. Cl.
CPC ........ *H04L 63/0435* (2013.01); *G06F 21/554* (2013.01); *G06N 3/08* (2013.01); *H04L 63/0442* (2013.01); *H04L 63/045* (2013.01)

(58) Field of Classification Search
CPC ............... G06F 21/554; H04L 63/0428; H04L 63/0435; H04L 63/0442; H04L 63/045
See application file for complete search history.

(56) References Cited

U.S. PATENT DOCUMENTS

| | | | |
|---|---|---|---|
| 6,351,711 B1 * | 2/2002 | Chansarkar | G01S 19/42 |
| | | | 701/481 |
| 11,443,049 B2 | 9/2022 | Tyagi et al. | |
| 11,676,011 B2 | 6/2023 | Linton et al. | |
| | | (Continued) | |

OTHER PUBLICATIONS

D. Stutz, "Implementing Tensorflow Operations in C++—Including Gradients," https://davidstutz.de/implementing-tensorflow-operations-in-c-including-gradients/, Feb. 4, 2017, 14 pages.

(Continued)

*Primary Examiner* — Dao Q Ho
(74) *Attorney, Agent, or Firm* — Ryan, Mason & Lewis, LLP (57) ABSTRACT

Embodiments of the present disclosure relate to a method, a device, and a computer program product for inference. The method includes determining, for a layer in a neural network model, whether a weight matrix of the layer is an irreversible target matrix. The method further includes partitioning, in response to determining that the weight matrix of the layer is the target matrix, the neural network model into a first part and a second part, wherein the first part includes the layer and a previous layer before the layer and is deployed inside a security space, and the second part includes a subsequent layer after the layer and is deployed outside the security space. The method further includes acquiring an inference result by using the partitioned neural network model based on encrypted inference data.

20 Claims, 5 Drawing Sheets

(56) References Cited

U.S. PATENT DOCUMENTS

| | | | |
|---|---|---|---|
| 2018/0121796 A1* | 5/2018 | Deisher | G10L 15/16 |
| 2018/0357540 A1* | 12/2018 | Hwang | G06V 30/19173 |
| 2019/0171833 A1* | 6/2019 | Zhang | H04L 63/0428 |
| 2019/0197116 A1* | 6/2019 | Vlad | G06N 3/08 |
| 2020/0082270 A1 | 3/2020 | Gu et al. | |
| 2021/0012001 A1* | 1/2021 | Nishino | G06N 3/084 |
| 2021/0049284 A1 | 2/2021 | Tyagi et al. | |
| 2021/0049299 A1 | 2/2021 | Pacella et al. | |
| 2021/0319098 A1* | 10/2021 | Pogorelik | G06N 3/045 |
| 2022/0036155 A1* | 2/2022 | Guevara | G06N 3/063 |
| 2022/0197994 A1 | 6/2022 | Sternby et al. | |
| 2022/0321647 A1 | 10/2022 | Berggren et al. | |
| 2022/0327363 A1* | 10/2022 | Xu | G06N 3/044 |
| 2022/0405383 A1 | 12/2022 | Liu et al. | |
| 2023/0130021 A1* | 4/2023 | Jitkrittum | G06N 3/08 706/25 |
| 2024/0119142 A1* | 4/2024 | Assion | G06F 21/64 |

OTHER PUBLICATIONS

Github, Inc. "Create an op," https://github.com/tensorflow/docs/blob/master/site/en/guide/create_op.md, Jul. 16, 2020, 30 pages.

Microsoft, "Microsoft Seal," https://www.microsoft.com/en-us/research/project/microsoft-seal/, 2021, 4 pages.

Fate, "An Industrial Grade Federated Learning Framework," https://fate.fedai.org/, 2021, 5 pages.

Github, Inc. "Deep Learning with Intel SGX," https://github.com/landoxy/intel-sgx-deep-learning, Jan. 21, 2019, 4 pages.

Intel Corporation, "Intel® SGX SDK Developer Reference for Windows," Mar. 10, 2020, 461 pages.

Wikipedia, "Software Guard Extensions," https://en.wikipedia.org/w/index.php?title=Software_Guard_Extensions&oldid=1028673056, Jun. 15, 2021, 5 pages.

Wikipedia, "Trusted Execution Environment," https://en.wikipedia.org/w/index.php?title=Trusted_execution_environment&oldid=1027841774, Jun. 10, 2021, 7 pages.

* cited by examiner

METHOD, DEVICE, AND PROGRAM PRODUCT FOR INFERENCE

RELATED APPLICATION

The present application claims priority to Chinese Patent Application No. 202311873051.0, filed Dec. 29, 2023, and entitled "Method, Device, and Program Product for Inference," which is incorporated by reference herein in its entirety.

FIELD

Embodiments of the present disclosure generally relate to the field of computers, and more particularly, to a method, a device, and a program product for inference.

BACKGROUND

With the rapid development of artificial intelligence and/or machine learning (AI/ML) technologies, their applications in many fields are becoming increasingly widespread. However, despite significant improvements brought about by the popularization of these technologies in many fields (such as preference recommendation, smart city, and assisted/autonomous driving), data security and privacy protection issues are also increasingly prominent.

Ensuring the security and reliability of operations and data flows is particularly important in various stages of machine learning tasks. Accordingly, there is a need for appropriate and effective security measures and technical means to ensure secure execution of machine learning operations, so that data can be kept complete and confidential while being used reasonably and legally.

SUMMARY

Embodiments of the present disclosure provide a solution for inference, and secure deployment can be provided for model execution through the solution, thereby ensuring the security and reliability of operations and data flows.

In a first aspect of the present disclosure, a method for inference is provided, and the method includes determining, for a layer in a neural network model, whether a weight matrix of the layer is an irreversible target matrix. The method further includes partitioning, in response to determining that the weight matrix of the layer is the target matrix, the neural network model into a first part and a second part, wherein the first part includes the layer and a previous layer before the layer and is deployed inside a security space, and the second part includes a subsequent layer after the layer and is deployed outside the security space. The method further includes acquiring an inference result by using the partitioned neural network model based on encrypted inference data.

In another aspect of the present disclosure, an electronic device for inference is provided. The electronic device includes at least one processor and a memory, the memory being coupled to the at least one processor and storing instructions, wherein the instructions, when executed by the at least one processor, cause the electronic device to perform actions including: determining, for a layer in a neural network model, whether a weight matrix of the layer is an irreversible target matrix. The actions further include partitioning, in response to determining that the weight matrix of the layer is the target matrix, the neural network model into a first part and a second part, wherein the first part includes the layer and a previous layer before the layer and is deployed inside a security space, and the second part comprises a subsequent layer after the layer and is deployed outside the security space. The actions further include acquiring an inference result by using the partitioned neural network model based on encrypted inference data.

In still another aspect of the present disclosure, a computer program product is provided. The computer program product is tangibly stored on a non-transitory computer-readable medium and includes machine-executable instructions, wherein the machine-executable instructions, when executed by a machine, cause the machine to perform a method or process according to embodiments of the present disclosure.

In a solution for inference according to embodiments of the present disclosure, reasonably and partially deploying the model in a trusted security zone can provide a secure and reliable deployment environment for machine learning tasks while ensuring resource balance and model performance. Even if some intermediate parameters or data is exposed, it cannot be inferred backwards to cause further leakage, thereby protecting the data security and privacy.

It should be noted that this Summary is provided to introduce a series of concepts in a simplified manner, and these concepts will be further described in the Detailed Description below. The Summary is neither intended to identify key features or necessary features of the present disclosure, nor intended to limit the scope of the present disclosure.

BRIEF DESCRIPTION OF THE DRAWINGS

By description of embodiments of the present disclosure, provided in further detail herein with reference to the accompanying drawings, the above and other objectives, features, and advantages of the present disclosure will become more apparent, in which.

Throughout all the drawings, the same or similar reference numerals generally represent the same or similar elements.

DETAILED DESCRIPTION

Illustrative embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects, unless otherwise specifically indicated.

As mentioned above, with the widespread application of AI/ML technologies, data security and privacy protection issues are becoming increasingly prominent. Ensuring the security and reliability of operations and data flows is particularly important in various stages of machine learning tasks. In order to ensure the secure execution of machine learning operations and ensure that data is used reasonably and legally in a complete and confidential manner, appropriate and effective security measures and technical means need to be taken. In practical applications, it is necessary to always pay attention to the integrity and confidentiality of data, and ensure that machine learning operations are not affected by security degradation such as illegal attacks.

By way of example rather than limitation, geographic data may be used in development of an assisted/autonomous driving system, for example, for training a model or inferring through a trained model. However, the geographic data may not be directly accessible to system developers or service providers or may be invisible to developers, as such data is sensitive to managers or users. In addition, during the use of such data, it is also necessary to prevent adverse attacks from obtaining original inputs through final or intermediate results (such as data or parameters). Therefore, the importance of protecting data security in such or similar scenarios is self-evident.

For example, a large number of Internet of Things (IoT) devices are now deployed for corresponding functionality. For machine learning applications, these IoT devices are typically used for inference so that computing may be performed at or near a place of data generation. At the same time, such devices are often placed in physically insecure locations, and hackers may steal the generated data.

In this case, data encryption (such as confidentiality and authentication) will be a solution to protect data from direct access. In an ideal situation, it is hoped that there is a difference between a training stage and an inference stage. For example, a weight matrix and a bias item during the inference stage are visible or acquirable, and once some intermediate data or parameters are exposed through hacker means, the consequences will be difficult to imagine. All of these will make it more difficult to protect data security during the inference stage.

Traditional methods may deploy the entire model in a security space to achieve a completely secure environment. However, in reality, the size of a security space that a processor can typically provide is limited. Even though security spaces of some chips are relatively large, their usage costs are very high. In addition, some security spaces only support central processing unit (CPU) computing and may reduce the performance compared with a graphics processing unit (GPU) implementation.

At least to address at least some of the above and other potential problems, embodiments of the present disclosure provide a solution for inference. The solution involves determining, for a layer in a neural network model, whether a weight matrix of the layer is an irreversible target matrix. The solution further includes partitioning, in response to determining that the weight matrix of the layer is the target matrix, the neural network model into a first part and a second part, wherein the first part includes the layer and a previous layer before the layer and is deployed inside a security space, and the second part includes a subsequent layer after the layer and is deployed outside the security space. The solution further includes acquiring an inference result by using the partitioned neural network model based on encrypted inference data. In this way, partially deploying the model in a trusted security zone can provide a secure deployment environment for machine learning tasks while ensuring resource balance and model performance. Even if some intermediate data or parameters are exposed, it cannot be inferred backwards to cause further leakage, thereby protecting the data security and privacy.

Principles and several example implementations of the present disclosure are described below with reference to FIG. 1 to FIG. 7. It should be understood that these example embodiments are provided merely to enable those skilled in the art to better understand and then implement embodiments of the present disclosure, and are not intended to impose any limitation to the scope of the present disclosure.

Figure 1:
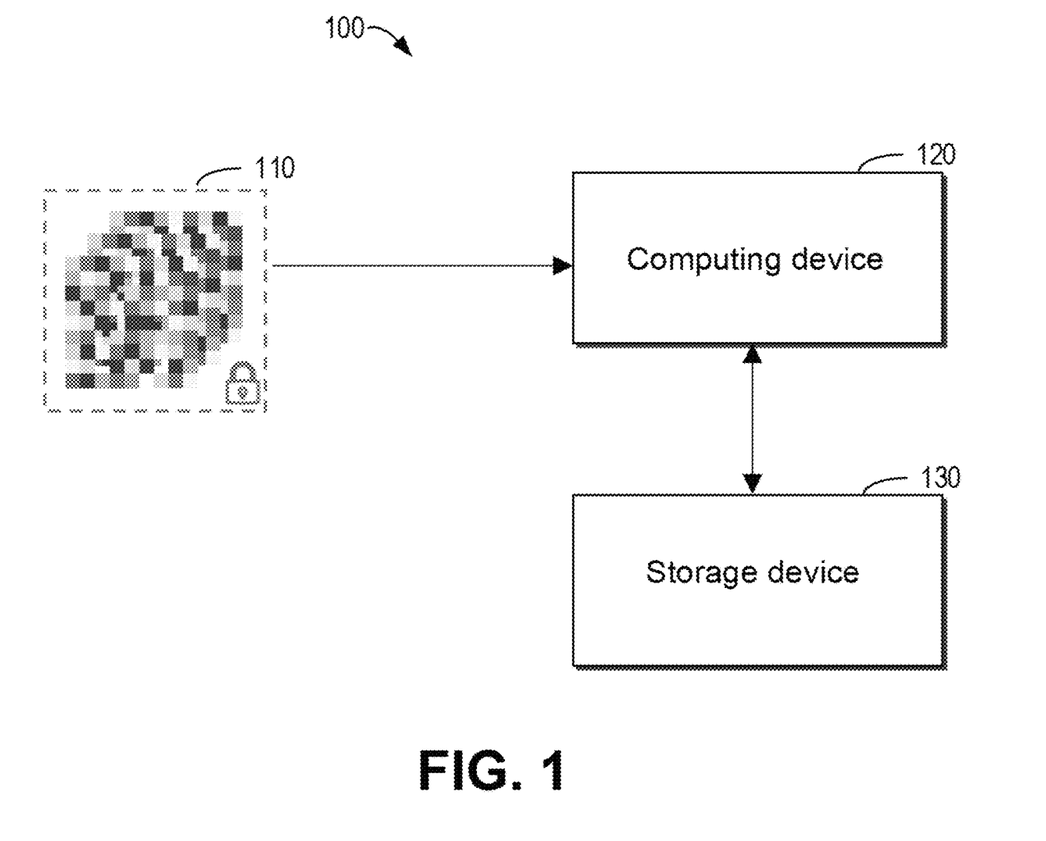
FIG. 1 is a schematic diagram of an example environment in which a method and/or a process according to embodiments of the present disclosure can be implemented.

FIG. 1 is a schematic diagram of an example environment 100 in which a method and/or a process according to embodiments of the present disclosure can be implemented. The example environment 100 exemplarily illustrates a hierarchical storage system including a plurality of nodes. As shown in FIG. 1, the example environment 100 may include an input 110, a computing device 120, and a storage device 130. It should be understood that limited components or units are shown here only for the purpose of case of understanding and illustration, but embodiments of the present disclosure are not limited thereto, and may further include other devices or systems. For example, the example environment 100 may further include a display (not shown), with the display being configured to display an inference result of the computing device 120.

According to embodiments of the present disclosure, the input 110 includes inference data that is encrypted (hereinafter also referred to as encrypted inference data in brief). The inference data may be encrypted using a key at a data source, where the data source may be a source of generating the inference data. In some embodiments, in response to its generation, the inference data may be encrypted at a place where it is generated. Types of the inference data may include but are not limited to text, image, audio, video, and the like. It should be understood that the present disclosure does not impose restrictions or constraints on the size and type of the inference data, as long as they correspond to a model into which the data is fed.

As mentioned above, the inference data is encrypted at the data source. According to embodiments of the present disclosure, the encrypted inference data can be decrypted only in a trusted security zone, for example, decrypted by performing confidential computing in the zone based on the key at the data source mentioned above. In this way, it can ensure the integrity and confidentiality of the inference data from its generation place to the security zone, and prevent security degradation such as data leakage during the process. The trusted security zone according to embodiments of the present disclosure will be described below in further detail.

According to embodiments of the present disclosure, a neural network model for predetermined functionality (such as classification and prediction), such as a deep learning model, can be run on the computing device 120. The computing device 120 may have computing power corresponding to running the model, and may be arranged locally or distributed in the cloud, or a combination thereof. The computing device 120 may load the neural network model from the storage device 130, and during the running of the neural network model, access the storage device 130 and perform corresponding computing by using data stored in the storage device 130. It should be understood that the computing device 120 is schematically shown as one computing device in FIG. 1, but this is only for the convenience of illustration and easy understanding. In the example environment 100, more computing devices may be arranged according to actual needs.

The computing device 120 may be configured with a security space, that is, the trusted security zone mentioned above. According to embodiments of the present disclosure, the security space may be an independent and isolated secure execution environment, for example, implemented on a chip (such as through a security processor). Such an environment provides a confidential space for sensitive data and computing to achieve secure operations, integrity protection, and the like, protecting them from external threats, thereby ensuring that data and computing are protected in terms of security, integrity, and privacy throughout the entire processing therein. Examples of the security space according to embodiments of the present disclosure may include, but are not limited to, a trusted execution environment (TEE), and the like. In some embodiments, the security space may be configured to perform secure computing including decryption, authentication, and the like therein, and the security space may be configured to have a size corresponding to computing resources (computing power of the chip or processor). In the following text, the corresponding operations on the computing device 120 will be further described in detail.

By way of example rather than limitation, the computing device 120 may include but is not limited to a personal computer, a laptop, a server computer, a mobile device (such as a smartphone and a tablet), a wearable electronic device, a multimedia player, a personal digital assistant (PDA), a smart home device, a consumer electronics product, a distributed computing environment including any one or more of the aforementioned devices, or the like. In some embodiments, a part of the computing device 120 may be arranged locally, while the other part may be arranged in the cloud.

According to embodiments of the present disclosure, the storage device 130 may be configured to store a model and its various parameters to be run on the computing device 120. In addition, the storage device 130 may be configured to store an input and an output (that is, inference data and an inference result) of the model, and the like. The training situation is similar to this, and thus will not be repeated. It should be understood that the storage device 130 is schematically shown as one storage device in FIG. 1, but this is only for the convenience of illustration and easy understanding. In the example environment 100, more storage devices may be arranged according to actual needs.

By way of example rather than limitation, the storage device 130 may include but is not limited to a local storage device, a remote storage device, and a combination thereof. In some embodiments, a plurality of storage devices in the storage device 130 may include but are not limited to hard disk drives (HDDs), solid state drives (SSDs), and the like, and some of the plurality of storage devices may be arranged locally while others may be arranged remotely and coupled together, for example, via a line, a network, or the like.

The example environment 100 in which the method and/or process according to embodiments of the present disclosure may be implemented has been described above with reference to FIG. 1. A flow chart of a method 200 for inference according to an embodiment of the present disclosure will be described below with reference to FIG. 2. Through the method 200, the model may be reasonably and securely deployed, with at least a part deployed in the trusted security zone. In this way, machine learning tasks may be safely and confidentially executed while ensuring resource balance and model performance, even if some intermediate results are unexpectedly exposed, thereby eliminating the possibility of inferring backwards to obtain raw data, and protecting the security and privacy of data and computing.

Figure 2:
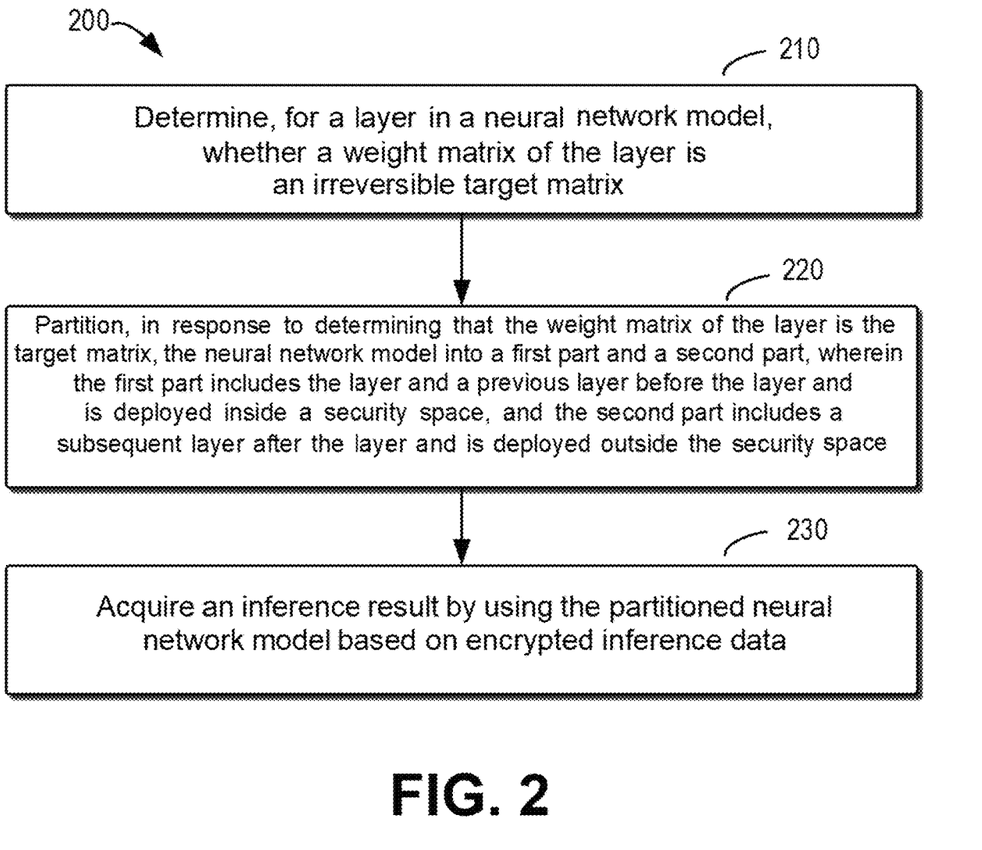
FIG. 2 is a flow chart of a method for inference according to an embodiment of the present disclosure.

At block 210, it is determined, for a layer in the neural network model, whether a weight matrix of the layer is an irreversible target matrix. As mentioned above, the computing device 120 loads the neural network model from the storage device 130 and runs the model on it for specific functionalities. A model architecture for a neural network includes one or a plurality of layers, and each layer has its corresponding weight matrix. The weight matrix is a key parameter that connects different layers and may have different shapes or patterns. According to embodiments of the present disclosure, it may be determined, for these neural network layers, whether the corresponding weight matrices are irreversible. If the weight matrix of a certain layer is irreversible, it means that from this layer backwards, it is impossible to infer reversely to obtain the original input or relevant information of the layer before this layer. A process of determining a target matrix according to embodiments of the present disclosure will be described below in further detail.

At block 220, in response to determining that the weight matrix of the layer is the target matrix, the neural network model is partitioned into a first part and a second part, wherein the first part includes the layer and a previous layer before the layer and is deployed inside a security space, and the second part includes a subsequent layer after the layer and is deployed outside the security space. According to embodiments of the present disclosure, the security space is an isolated independent execution environment, within which data and computing are protected in terms of security, integrity, and privacy. As discussed above, deploying the entire model in a security space can ensure operational security, but it will result in high deployment costs and a risk of performance degradation. By performing the operation described in block 220, effective deployment and partitioning of the model can be achieved.

According to embodiments of the present disclosure, the layer determined to include the irreversible target matrix and a layer prior to the layer (also referred to as the previous layer in the following text) are deployed in the security space. In other words, the weight matrix of at least one neural network layer of the neural network layers deployed in the security space is irreversible, so that even if an output of any layer in layers subsequent to the layer (also referred to as the subsequent layer in the following text) is known, the original input cannot be inferred reversely. A model secure deployment process according to embodiments of the present disclosure will be described below in further detail.

At block 230, an inference result is acquired by using the partitioned neural network model based on encrypted inference data. According to embodiments of the present disclosure, the model is reasonably partitioned, with one part deployed inside the security space and the other part deployed outside the security space. In this way, feeding the encrypted inference data into the reasonably partitioned neural network model can ensure data and computational security, and at the same time, perform high-performance inference to achieve a desired result, such as performing inference by using a GPU. An inference process according to embodiments of the present disclosure will be described below in further detail.

Therefore, in the method 200 for inference according to embodiments of the present disclosure, reasonably and partially deploying the model in a trusted security zone can provide a secure and reliable deployment environment for machine learning tasks while ensuring resource balance and model performance. Even if some intermediate parameters or data is exposed, it cannot be inferred backwards to cause further leakage, thereby protecting the data security and privacy.

Figure 3:
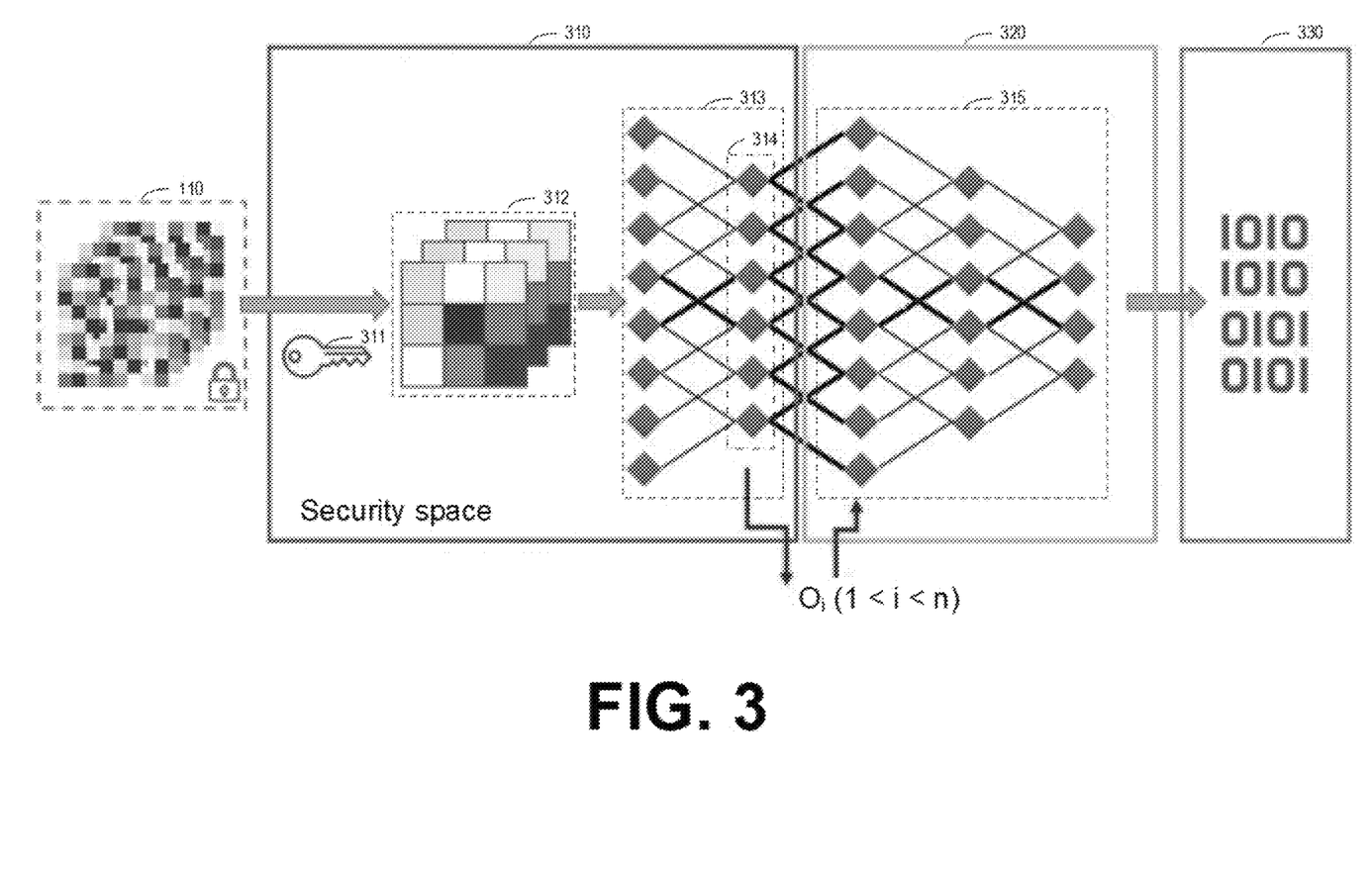
FIG. 3 is a schematic diagram of a model input/output flow according to an embodiment of the present disclosure.

FIG. 3 is a schematic diagram of a model input/output flow 300 according to an embodiment of the present disclosure. It should be understood that in the following text, a neural network model will be used for unrestricted description, and other different models, such as a deep learning model or a backpropagation neural network model, may be adopted according to specific usage needs.

As shown in FIG. 3, an input 110 including encrypted inference data will be fed into a neural network model that is separately arranged inside a security space 310 and a space outside the security space (referred to as a general space 320 for ease of reference in the following text). In some embodiments, the neural network model is a trained model and has a parameter set corresponding to the input 110 including the encrypted inference data, that is, the parameter set adjusted for the data. A complete inference process based on the encrypted inference data according to embodiments of the present disclosure will be introduced below.

Figure 4:
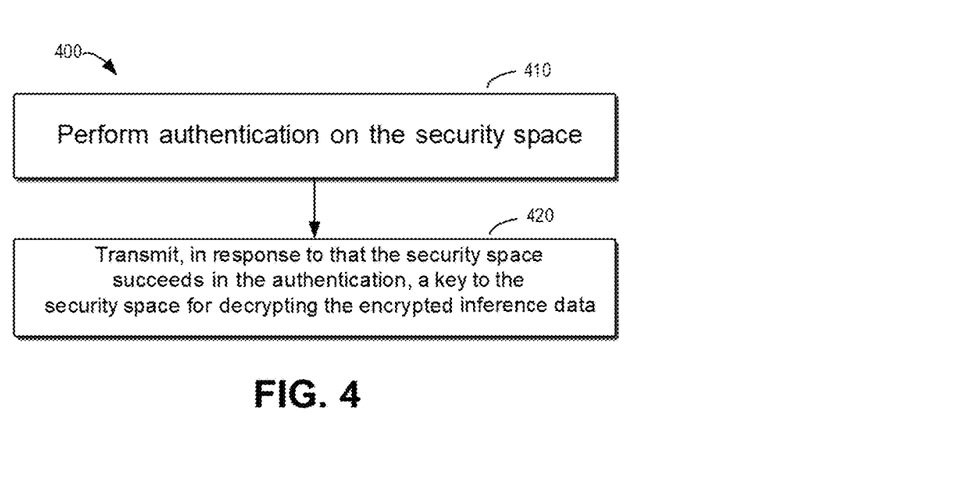
FIG. 4 is a flow chart of a security space verification process according to an embodiment of the present disclosure.

To further ensure the reliability of the security space 310, a security space verification process 400 according to embodiments of the present disclosure may be adopted. FIG. 4 is a flow chart of the security space verification process 400 according to an embodiment of the present disclosure. At block 410, authentication may be performed on the security space 310, and at block 420, in response to the security space 310 succeeding in the authentication, a key 311 may be sent from a data source of the encrypted inference data to the security space 310. The key 311 encrypts the inference data at the data source and decrypts the encrypted inference data within the security space 310. The decrypted encrypted inference data 312 is only used by the neural network layer within the security space 310 for performing corresponding computing, and is invisible outside the security space 310. In other words, the decrypted encrypted inference data 312 cannot be identified externally. Returning to FIG. 3, the decrypted encrypted inference data 312 may be fed into a first part 313 of the neural network model deployed inside the security space 310.

According to embodiments of the present disclosure, starting from a first layer of the neural network model, it is sequentially determined layer by layer whether a corresponding weight matrix of each layer is an irreversible target matrix, wherein the target matrix is a non-square matrix. In the case of forward propagation, starting from a first neural network layer, it is sequentially determined layer by layer whether a weight matrix of each neural network layer is an irreversible matrix. It should be understood that the non-square matrix is one of many examples of the target matrix according to embodiments of the present disclosure, and the target matrix may further include, but is not limited to, a singular matrix, a diagonal matrix, an upper triangular matrix, a lower triangular matrix, an atomic matrix, a pseudo inverse matrix, and the like.

As shown in FIG. 3, it is determined from left to right whether the weight matrix of each neural network layer is irreversible. It should be understood that sequential layer-by-layer determination is only one implementation of determining whether the weight matrices of the layers are irreversible. Embodiments of the present disclosure are not limited to this and may further include reverse layer-by-layer determination (in the case of backpropagation), or randomly selecting a predetermined number of layers (which may be inconsecutive) and determining whether their weight matrices are irreversible.

According to embodiments of the present disclosure, during the layer-by-layer determination period, in response to determining for the first time that a weight matrix corresponding to a layer is an irreversible target matrix, a reasonable boundary for the partial deployment of the model may be determined. As exemplified in FIG. 3, layer-by-layer determination is performed sequentially from the first layer, and in response to a neural network layer (by way of example rather than limitation, for example, a layer 314 shown in FIG. 3) being a non-square matrix, the layer 314 and its previous layer before it may be determined as the first part of the neural network and deployed inside the security space 310. In addition, one or more subsequent layers after the layer 314 may be identified as the second part 315 of the neural network, and they may be deployed in the general space 320 outside the security space 310. As shown in FIG. 3, an output of a former layer will be used as an input for a later layer for performing corresponding computing. For example, an output $O_i$ of the layer 314 at the boundary may be used as an input for a later layer thereof in the second part 315. After computing at various layers of the neural network model in the security space 310 and the general space 320, a final inference result 330 is output.

In some embodiments, taking forward propagation of the neural network as an example, the output of a neural network layer may be as the following Equation (1):

$$O_i = \sigma(M_i * O_{i-1} + b_i) \quad (1)$$

wherein $O_i$ is the output of the ith layer, which is based on the weight matrix $M_i$ of the layer, the input $O_{i-1}$ of the layer (that is, the output of its previous layer), a bias item $b_i$, and other weights and parameters $\sigma$.

Unlike in the training stage, the weight matrices $M_i$ and bias items bi of various layers of the trained neural network model may be known or acquirable. Once an intermediate result $O_{i-1}$ is exposed, it is highly possible to infer reversely to obtain the result of the previous layer or even the original input, leading to security degradation. According to embodiments of the present disclosure, at least one neural network layer whose weight matrix $M_i$ is irreversible is included in the security space 310, thereby completely eliminating the occurrence of the above reverse inference situation and significantly improving the security. It should be understood that during the retraining stage, the model deployment partitioning described above may also be used, and the process is similar to the above content, which will not be repeated here.

Figure 5:
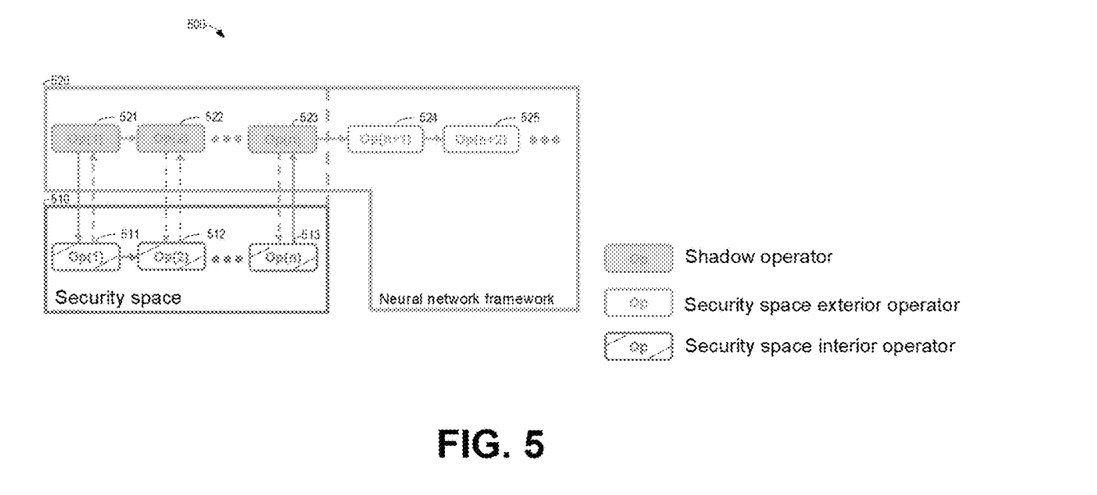
FIG. 5 is a schematic diagram of an operator mapping process according to an embodiment of the present disclosure.

FIG. 5 is a schematic diagram of an operator mapping process 500 according to an embodiment of the present disclosure. As mentioned above, different portions of the neural network model are deployed separately inside the security space 310 and in the general space 320 outside the security space. In the following text, cross-space interaction between operators in the model will be described. The operator mapping process 500 according to embodiments of the present disclosure can effectively reduce the cost of cross-space interaction between operators in the model (such as saving computational and communication resources).

According to embodiments of the present disclosure, a security space interior operator for at least one layer of the first part of the neural network model deployed inside the security space 510 is identified within the security space 510, and a security space exterior operator for at least one layer of the second part of the neural network model deployed outside the security space 510 is identified within a neural network framework 520. As exemplified in FIG. 5, the security space 510 may include security space interior operators 511, 512, 513, and the like, and the neural network framework 520 may include security space exterior operators 524, 525, and the like.

Furthermore, according to embodiments of the present disclosure, a shadow operator corresponding to each security space interior operator in the security space interior operators may be determined in the neural network framework 520, such as shadow operators 521, 522, and 523 shown in FIG. 5. In this way, a correspondence is formed between each security space interior operator and a corresponding shadow operator. As shown schematically in FIG. 5, the shadow operators 521, 522, and 523 and the security space exterior operators 524 and 525 form a consecutive operator sequence in the neural network framework 520, and the last shadow operator (that is, the shadow operator 523 in FIG. 5) in the shadow operators 521, 522, and 523 is coupled to the first security space exterior operator (that is, the security space exterior operator 524) in the security space exterior operators 524 and 525. Here, the shadow operator may be a virtually set operator and may be configured to send and receive indications to/from the security space interior operators, and to forward security space interior computing results to the security space exterior operators. The inference process according to embodiments of the present disclosure will be described below in further detail with reference to FIG. 5.

According to embodiments of the present disclosure, in response to the encrypted inference data being decrypted, the first security space interior operator 511 in the security space interior operators 511, 512, and 513 performs computing (hereinafter referred to as first security space interior computing) corresponding to the operator within the security space 510 based on the decrypted encrypted inference data, sends a first computing result to the second security space interior operator 512 after the first security space interior operator 511, and sends a first virtual computing result to the first shadow operator 521 in the shadow operators 521, 522, and 523 corresponding to the first security space interior operator 511. The first virtual computing result does not imply a true computing result of the first security space interior operator 511, but may indicate the completion of the computing corresponding to the operator. Additionally or alternatively, the first security space interior operator 511 may start computing in response to the indication from the first shadow operator 521.

Next, in response to the second security space interior operator 512 in the security space interior operators 511, 512, and 513 receiving the first computing result from the first security space interior operator 511 and the indication from the second shadow operator 522 in the shadow operators 521, 522, and 523, the second security space interior operator 512 may perform second computing corresponding to the operator, send a second computing result to the third security space interior operator 513 after the second security space interior operator 512, and send a second virtual computing result to the second shadow operator 522 in the shadow operators 521, 522, and 523 corresponding to the second security space interior operator 512. According to embodiments of the present disclosure, the process may be repeated till the last security space interior operator.

According to embodiments of the present disclosure, in response to the last security space interior operator (for example, the security space interior operator 513 in FIG. 5) receiving a second-to-last computing result (that is, the above second result) of the previous second-to-last security space interior operator (for example, the security space interior operator 512 in FIG. 5) and the indication from the last shadow operator (for example, the shadow operator 523 in FIG. 5) in the shadow operators corresponding to the security space interior operator 513, the security space interior operator 513 performs last security space interior computing and sends a security space interior computing result (that is, a final computing result in the security space 510) to the shadow operator 523.

As can be seen, the security space interior operators do not send the computing results corresponding to themselves to the shadow operators, but only transmit indications such as the completion of the computing. In addition, the shadow operators only send indications, such as to start corresponding computing, to the security space interior operators. In this way, computational and communication resources can be saved for operator interaction between the security space 510 and the neural network framework 520, thereby promoting the entire computing process.

According to embodiments of the present disclosure, in response to the first security space exterior operator 524 in the security space exterior operators 524 and 525 receiving the security space interior computing result from the last shadow operator 523 in the shadow operators 521, 522, and 523, each security space exterior operator in the security space exterior operators sequentially performs corresponding computing one by one until a security space exterior computing result is generated.

Figure 6:
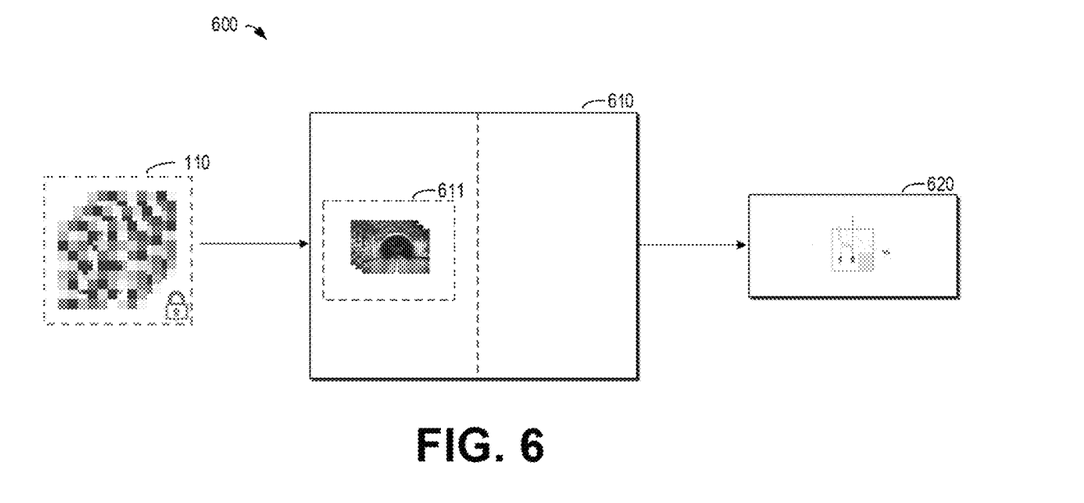
FIG. 6 is a schematic diagram of an inference application for path planning according to an embodiment of the present disclosure.

FIG. 6 is a schematic diagram of an inference application 600 for path planning according to an embodiment of the present disclosure. As shown in FIG. 6, the input 110 including the encrypted inference data is fed into a neural network model 610 that is reasonably deployed and partitioned, with one part inside the security space to ensure the security and the other part outside the security space to ensure the performance.

According to embodiments of the present disclosure, the encrypted inference data may include an encrypted current driving scenario image for a vehicle, and such geographic data is sensitive to managers or users, and thus requires alignment for protection. The encrypted current driving scenario image may be fed into the first part of the neural network model deployed inside the security space to obtain a first output of the first part. The encrypted current driving scenario image may be decrypted in the security space, that is, a decrypted current driving scenario image 611.

According to embodiments of the present disclosure, the first output of the first part may be fed into the second part of the neural network model deployed outside the security space to obtain a second output of the second part, and the second output of the second part may be output, the second output indicating a future travel route predicted for the vehicle, that is, an inference result 620.

Figure 7:
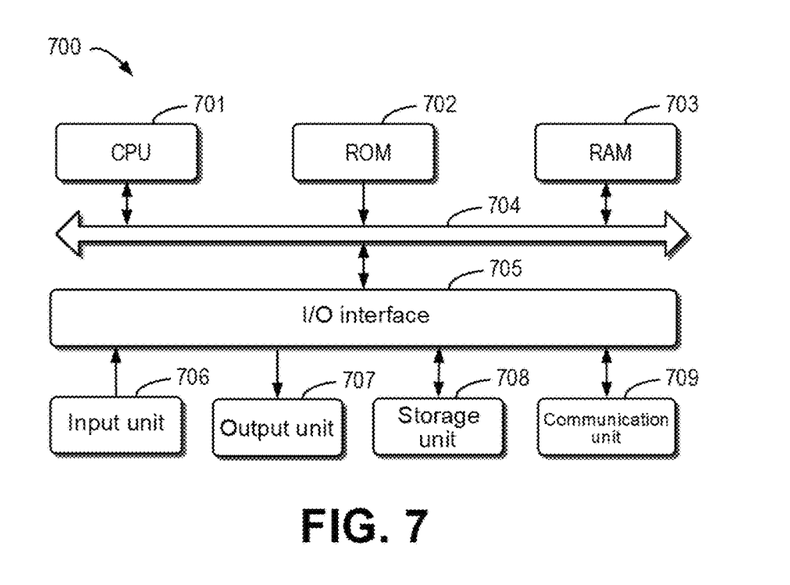
FIG. 7 is a block diagram of an example device that may be used to implement an embodiment of the present disclosure.

FIG. 7 is a block diagram of an example device 700 that may be used for implementing some embodiments according to the present disclosure. As shown FIG. 7, the device 700 includes a central processing unit (CPU) 701, which may execute various appropriate actions and processing in accordance with computer program instructions stored in a read-only memory (ROM) 702 or computer program instructions loaded from a storage unit 708 into a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the device 700 to exchange information/data with other devices via a computer network such as the Internet and/or various telecommunication networks.

The various processes and processing described above, such as the method 200, may be performed by the CPU 701. For example, in some embodiments, the method 200 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for inference, comprising:
   determining, for a layer in a neural network model, whether a weight matrix of the layer is an irreversible target matrix;
   partitioning, in response to determining that the weight matrix of the layer is the target matrix, the neural network model into a first part and a second part, wherein the first part comprises the layer and a previous layer before the layer and is deployed inside a security space, and the second part comprises a subsequent layer after the layer and is deployed outside the security space;
   identifying, within the security space, at least one security space interior operator for at least one layer of the first part of the neural network model deployed inside the security space;
   identifying, within a neural network framework, at least one security space exterior operator for at least one layer of the second part of the neural network model deployed outside the security space;
   determining, within the neural network framework, one or more shadow operators corresponding to respective ones of one or more security space interior operators, wherein the one or more shadow operators and one or more security space exterior operators form a consecutive operator sequence in the neural network framework, and a last shadow operator in the one or more shadow operators is coupled to a first security space exterior operator in the one or more security space exterior operators; and
   acquiring an inference result by using the partitioned neural network model based on encrypted inference data.

2. The method according to claim 1, wherein determining, for the layer in the neural network model, whether the weight matrix of the layer is the target matrix comprises:
   determining, starting from a first layer of the neural network model, whether a corresponding weight matrix of each layer is the target matrix sequentially layer by layer, the target matrix being a non-square matrix; and
   wherein determining that the weight matrix of the layer is the target matrix comprises:
   determining, in a layer-by-layer determination period, for a first time that a corresponding weight matrix of a layer is the non-square matrix.

3. The method according to claim 1, wherein:
   the encrypted inference data is encrypted by using a key at a data source outside the security space, and
   the security space provides decryption for the encrypted inference data, and the decrypted encrypted inference data cannot be identified outside the security space.

4. The method according to claim 3, further comprising:
   performing authentication on the security space; and
   transmitting, in response to the security space succeeding in the authentication, the key to the security space for decrypting the encrypted inference data,
   wherein the decrypted encrypted inference data is fed into the first part of the neural network model deployed inside the security space.

5. The method according to claim 1, wherein the encrypted inference data comprises an encrypted current driving scenario image for a vehicle, and the method further comprises:
   feeding the encrypted current driving scenario image into the first part of the neural network model deployed inside the security space to obtain a first output of the first part;
   feeding the first output of the first part into the second part of the neural network model deployed outside the security space to obtain a second output of the second part; and
   outputting the second output of the second part, the second output indicating a future travel route predicted for the vehicle.

6. The method according to claim 1, wherein acquiring the inference result based on the encrypted inference data comprises:
   performing, in response to the encrypted inference data being decrypted, first security space interior computing by a first security space interior operator in the security space interior operators within the security space based on the decrypted encrypted inference data, sending a first computing result to a second security space interior operator after the first security space interior operator, and sending a first virtual computing result to a first shadow operator in the shadow operators corresponding to the first security space interior operator; and performing, in response to the last security space interior operator in the security space interior operators receiving a second-to-last computing result from the second-to-last security space interior operator before the last security space interior operator and an indication from the last shadow operator in the shadow operators corresponding to the last security space interior operator, last security space interior computing by the last security space interior operator and sending a result of the security space interior computing to the last shadow operator; and sending, by the last shadow operator, the security space interior computing result to the first security space exterior operator in the security space exterior operators.

7. The method according to claim 6, wherein acquiring the inference result based on the encrypted inference data further comprises:

performing, in response to the first security space exterior operator in the security space exterior operators receiving the security space interior computing result from the last shadow operator in the shadow operators, corresponding computing by each security space exterior operator in the security space exterior operators sequentially one by one until a security space exterior computing result is generated.

8. The method according to claim 1, wherein:
the security space is configured to have secure computing comprising decryption and authentication performed therein, and
the security space is configured to have a size corresponding to computing resources.

9. The method according to claim 1, wherein:
the neural network model is a trained model and has an adjusted parameter set corresponding to input data comprising the encrypted inference data.

10. An electronic device, comprising:
at least one processor; and
a memory, the memory being coupled to the at least one processor and storing instructions, wherein the instructions, when executed by the at least one processor, cause the electronic device to perform actions comprising:
determining, for a layer in a neural network model, whether a weight matrix of the layer is an irreversible target matrix;
partitioning, in response to determining that the weight matrix of the layer is the target matrix, the neural network model into a first part and a second part, wherein the first part comprises the layer and a previous layer before the layer and is deployed inside a security space, and the second part comprises a subsequent layer after the layer and is deployed outside the security space;
identifying, within the security space, at least one security space interior operator for at least one layer of the first part of the neural network model deployed inside the security space;
identifying, within a neural network framework, at least one security space exterior operator for at least one layer of the second part of the neural network model deployed outside the security space;
determining, within the neural network framework, one or more shadow operators corresponding to respective ones of one or more security space interior operators, wherein the one or more shadow operators and one or more security space exterior operators form a consecutive operator sequence in the neural network framework, and a last shadow operator in the one or more shadow operators is coupled to a first security space exterior operator in the one or more security space exterior operators; and
acquiring an inference result by using the partitioned neural network model based on encrypted inference data.

11. The electronic device according to claim 10, wherein determining, for the layer in the neural network model, whether the weight matrix of the layer is the target matrix comprises:

determining, starting from a first layer of the neural network model, whether a corresponding weight matrix of each layer is the target matrix sequentially layer by layer, the target matrix being a non-square matrix; and wherein determining that the weight matrix of the layer is the target matrix comprises:
determining, in a layer-by-layer determination period, for a first time that a corresponding weight matrix of a layer is the non-square matrix.

12. The electronic device according to claim 10, wherein:
the encrypted inference data is encrypted by using a key at a data source outside the security space, and
the security space provides decryption for the encrypted inference data, and the decrypted encrypted inference data cannot be identified outside the security space.

13. The electronic device according to claim 12, wherein the actions further comprise:
performing authentication on the security space; and
transmitting, in response to the security space succeeding in the authentication, the key to the security space for decrypting the encrypted inference data,
wherein the decrypted encrypted inference data is fed into the first part of the neural network model deployed inside the security space.

14. The electronic device according to claim 10, wherein the encrypted inference data comprises an encrypted current driving scenario image for a vehicle, and the actions further comprise:
feeding the encrypted current driving scenario image into the first part of the neural network model deployed inside the security space to obtain a first output of the first part;
feeding the first output of the first part into the second part of the neural network model deployed outside the security space to obtain a second output of the second part; and
outputting the second output of the second part, the second output indicating a future travel route predicted for the vehicle.

15. The electronic device according to claim 10, wherein acquiring the inference result based on the encrypted inference data comprises:
performing, in response to the encrypted inference data being decrypted, first security space interior computing by a first security space interior operator in the security space interior operators within the security space based on the decrypted encrypted inference data, sending a first computing result to a second security space interior operator after the first security space interior operator, and sending a first virtual computing result to a first shadow operator in the shadow operators corresponding to the first security space interior operator; and performing, in response to the last security space interior operator in the security space interior operators receiving a second-to-last computing result from the second-to-last security space interior operator before the last security space interior operator and an indication from the last shadow operator in the shadow operators corresponding to the last security space interior operator, last security space interior computing by the last security space interior operator and sending a result of the security space interior computing to the last shadow operator; and sending, by the last shadow operator, the security space interior computing result to the first security space exterior operator in the security space exterior operators.

16. The electronic device according to claim 15, wherein acquiring the inference result based on the encrypted inference data further comprises:

performing, in response to the first security space exterior operator in the security space exterior operators receiving the security space interior computing result from the last shadow operator in the shadow operators, corresponding computing by each security space exterior operator in the security space exterior operators sequentially one by one until a security space exterior computing result is generated.

17. The electronic device according to claim 10, wherein: the neural network model is a trained model and has an adjusted parameter set corresponding to input data comprising the encrypted inference data.

18. A computer program product, the computer program product being tangibly stored on a non-transitory computer-readable medium and comprising machine-executable instructions, wherein the machine-executable instructions, when executed by a machine, cause the machine to perform:

determining, for a layer in a neural network model, whether a weight matrix of the layer is an irreversible target matrix;

partitioning, in response to determining that the weight matrix of the layer is the target matrix, the neural network model into a first part and a second part, wherein the first part comprises the layer and a previous layer before the layer and is deployed inside a security space, and the second part comprises a subsequent layer after the layer and is deployed outside the security space;

identifying, within the security space, at least one security space interior operator for at least one layer of the first part of the neural network model deployed inside the security space;

identifying, within a neural network framework, at least one security space exterior operator for at least one layer of the second part of the neural network model deployed outside the security space;

determining, within the neural network framework, one or more shadow operators corresponding to respective ones of one or more security space interior operators, wherein the one or more shadow operators and one or more security space exterior operators form a consecutive operator sequence in the neural network framework, and a last shadow operator in the one or more shadow operators is coupled to a first security space exterior operator in the one or more security space exterior operators; and acquiring an inference result by using the partitioned neural network model based on encrypted inference data.

19. The computer program product according to claim 18, wherein:

the encrypted inference data is encrypted by using a key at a data source outside the security space, and the security space provides decryption for the encrypted inference data, and the decrypted encrypted inference data cannot be identified outside the security space.

20. The computer program product according to claim 19, wherein the machine-executable instructions, when executed by the machine, further cause the machine to perform:

performing authentication on the security space; and transmitting, in response to the security space succeeding in the authentication, the key to the security space for decrypting the encrypted inference data, wherein the decrypted encrypted inference data is fed into the first part of the neural network model deployed inside the security space.

\* \* \* \* \*